United States Patent [19]
Lassche

[11] Patent Number: 4,541,504
[45] Date of Patent: Sep. 17, 1985

[54] DEVICE FOR ACTIVATING A SWITCHING ELEMENT BY A DECELERATION THEREOF

[76] Inventor: Jakob Lassche, 45, Wiesenwegle, 7230 Schramberg, Fed. Rep. of Germany

[21] Appl. No.: 442,199
[22] PCT Filed: Mar. 4, 1982
[86] PCT No.: PCT/NL82/00006
§ 371 Date: Nov. 10, 1982
§ 102(e) Date: Nov. 10, 1982
[87] PCT Pub. No.: WO82/03134
PCT Pub. Date: Sep. 16, 1982

[30] Foreign Application Priority Data
Mar. 11, 1982 [NL] Netherlands .......................... 8101192

[51] Int. Cl.[4] .......................................... G05G 15/02
[52] U.S. Cl. ..................................... 180/268; 280/734; 280/806
[58] Field of Search ............... 180/268, 270, 282, 283; 280/734, 801, 806; 73/488; 116/203

[56] References Cited
U.S. PATENT DOCUMENTS

| | | | |
|---|---|---|---|
| 1,627,728 | 5/1927 | Conklin | 292/164 |
| 2,273,058 | 2/1942 | Miller | 180/284 |
| 3,240,510 | 3/1966 | Spouge | 180/268 |
| 3,550,717 | 12/1970 | Doty, Jr. | 180/284 |
| 3,668,675 | 6/1972 | Joens et al. | 340/539 |
| 3,873,042 | 3/1975 | Weman | 242/107.4 R |
| 3,915,401 | 10/1975 | Takada | 242/107.4 R |
| 4,058,134 | 11/1977 | Komatsu et al. | 116/203 |
| 4,204,703 | 5/1980 | Okada | 180/282 |

FOREIGN PATENT DOCUMENTS

| | | |
|---|---|---|
| 1940867 | 2/1971 | Fed. Rep. of Germany . |
| 1528672 | 6/1968 | France . |
| 2400450 | 3/1979 | France . |
| 2412321 | 7/1979 | France . |

Primary Examiner—Joseph F. Peters, Jr.
Assistant Examiner—Kenneth R. Rice
Attorney, Agent, or Firm—Diller, Ramik & Wight

[57] ABSTRACT

A weight is guided for free movement in a horizontal plane but is urged to a home position by the transmission mechanism which connects the weight to an actuated device. A ball with a flat face is seated in a cup and has an extension with a further ball received in an upstanding tube on the weight. A plunger with a button face engaging the flat face of the ball is spring urged to force such ball to that position which forces the weight to home position and the actuated device responds to movement of the plunger from such position.

14 Claims, 12 Drawing Figures

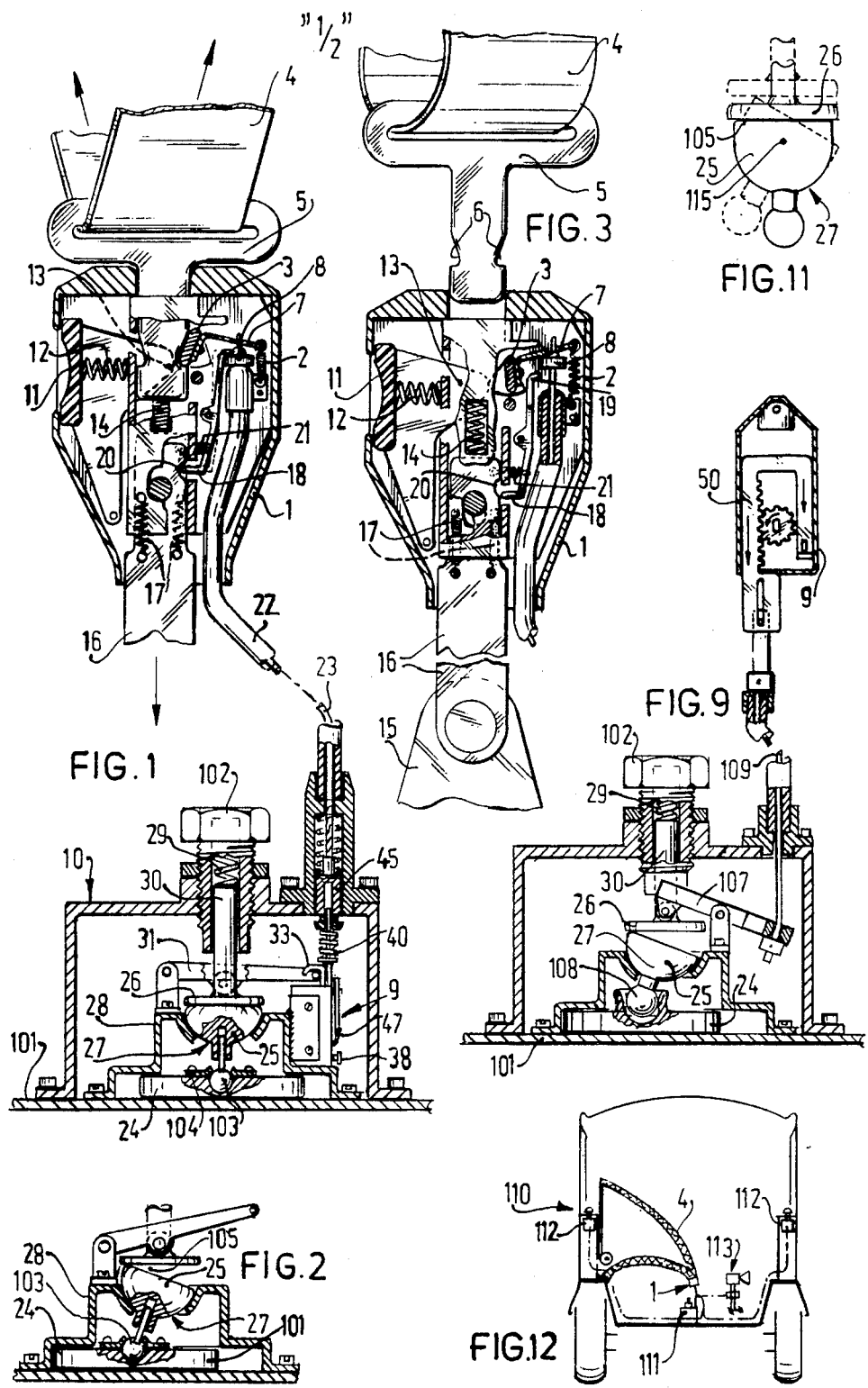

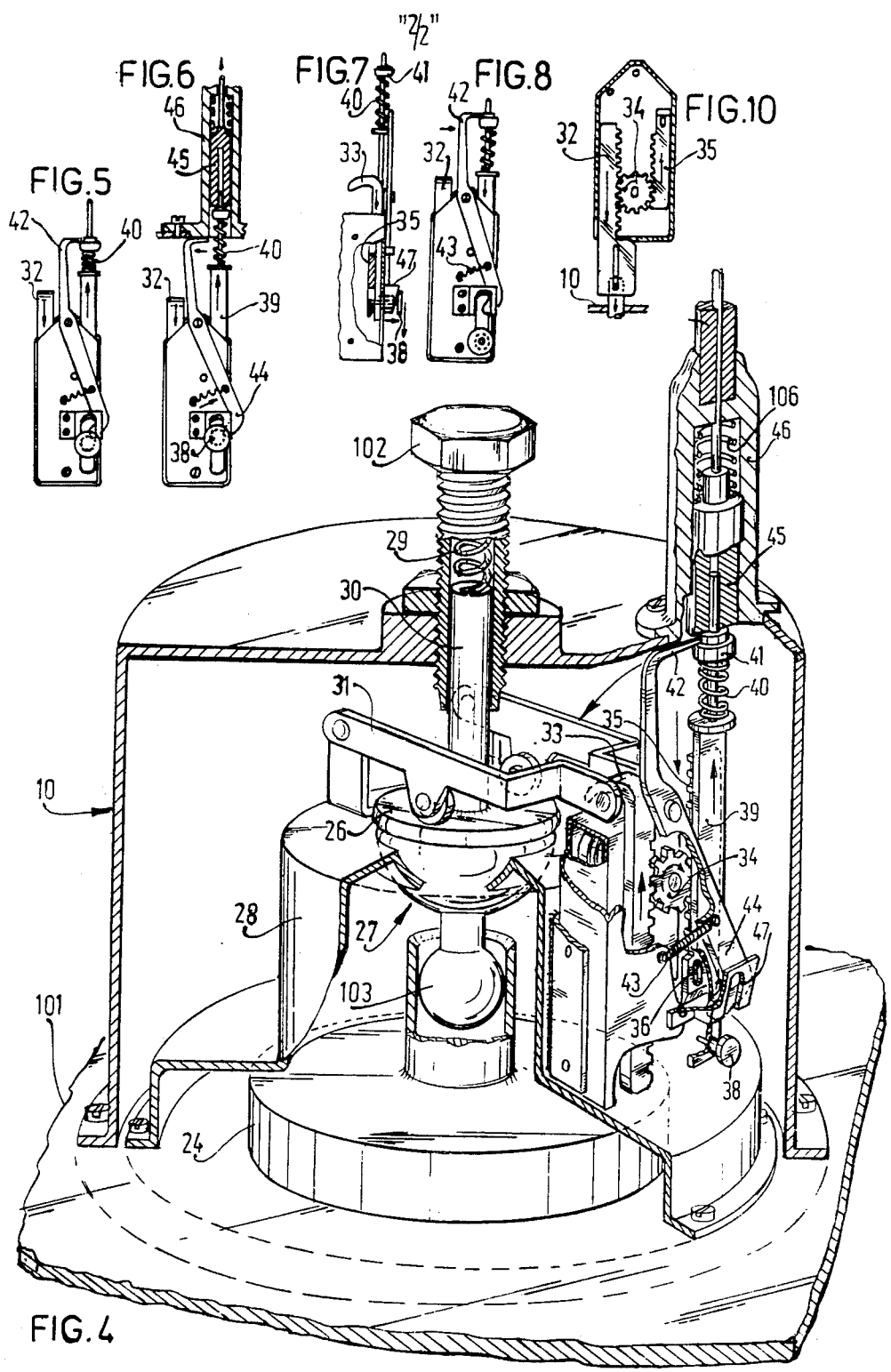

DEVICE FOR ACTIVATING A SWITCHING ELEMENT BY A DECELERATION THEREOF

The invention relates to a device for activating a switching element by a deceleration thereof comprising a frame, as mass movable in at least one horizontal direction and carried by said frame and transmission means connected with the frame and engaging said mass for transferring movements of the mass to the switching element.

Such a device is known from U.S. Pat. No. 3,915,401. Herein the mass is suspended like a pendulum. This known device has the disadvantage that when the mass laterally deflects due to a deceleration it additionally moves upwards. This upward movement is counteracted by gravity. The counteraction of the gravity strongly increases with an increasing deflection of the mass and hence with an increasing angle of the pendulum to the vertical. However, the switching effect can only occur at a given minimum deflection of the mass. As the deflection becomes larger, the ratio between the switching force to be produced and the counteracting force by gravity becomes more unfavourable. In order to have nevertheless a sufficient switching force available, the mass has to be relatively heavy so that the device becomes cumbersome. Moreover, for the same reason the spring force holding the mass in zero position must not be too high so that at a deceleration due to strong braking efforts the mass already deflects to some extent, which is annoyingly audible.

The invention has for its object to provide a device of the kind set forth in the preamble, which does not exhibit said disadvantages.

According to the invention this is achieved by guide means connected with the frame for slidably guiding the mass in a horizontal direction. Owing to the slidable support of the mass the latter does not move upwards when deflecting so that the switching force supplied by the mass is continuously equal to the product of the mass and the deceleration, independently of the deflection. Since in the device embodying the invention the force of gravity cannot counteract, the mass may be a light-weight structure as compared with the known embodiment.

When in accordance with the invention the mass has the shape of a disc an additional advantage is obtained in that the device has a small overall height.

According to the invention a reliably operating, preferred embodiment is obtained when the transmission means comprise a tilting element connected by a ball joint with the mass and journalled by a ball joint on the frame and provided with an annular tilting rim and a downwardly spring-loaded pressure element slidably journalled in the frame opposite the tilting rim and cooperating with the tilting rim.

Since the device embodying the invention a switching force independent of the deflection of the mass can be obtained, the transmission means may usefully comprise, in accordance with the invention, a delay device transferring the movements of the mass with time delay to the switching element. When once a given delay is exceeded the delay device will be fully stretched. In the device according to the invention it is not likely for the delay device to be stretched too little and hence for the transfer of the movements of the mass to the switching element not to be sufficiently delayed.

This is particularly important in the case in which in accordance with the invention the switching element is coupled with the lock bolt of a locking device of a safety belt for unlocking the same upon activation. It is desirable for a safety belt to automatically unlock some time after a collision so that the vehicle concerned can be easily left. It is obvious that premature unlocking of the locking device may have catastrophic consequences.

When the locking device for the safety belt comprises a blocking mechanism preventing, when exposed to tractive load, the switching element from unlocking injury due to an undesirable release of the safety belt is avoided.

According to the invention the device is not only suitable for unlocking a safety belt but also for unlocking a door lock. Moreover, the switching element according to the invention may be coupled with a member adapted to cut an electric current. In a further embodiment of the invention the switching element is actively coupled with a member adapted to block a fuel feed. In all these uses the safety of passengers of the vehicle, boat or airplane comprising the device embodying the invention is enhanced because in the case of an accident the device eliminates hindrances to saving operations and/or reduces fire risk.

When the switching element is actively coupled with the starting member of an alarm device, it can switch on said alarm device when a parked vehicle is run into.

Further features and advantages of the invention will become apparent from the following description of preferred embodiments thereof with reference to the drawings.

FIG. 1 is a sectional view of a device embodying the invention coupled with the locking device of a safety belt also shown in a sectional view;

FIG. 2 shows the device of FIG. 1 embodying the invention in operative position;

FIG. 3 shows part of the locking device of FIG. 1 in the open state;

FIG. 4 is a developed, perspective view of the device shown in FIG. 1;

FIGS. 5, 6, 7 and 8 are elevational views of the time-delay device of FIG. 1 in different positions.

FIG. 9 is a sectional view of a variant of the device embodying the invention;

FIG. 10 is a sectional view of a third embodiment of the time delay device;

FIG. 11 shows a partial sectional view of a further embodiment;

FIG. 12 schematically shows a vehicle in which the device embodying the invention is used.

FIGS. 1 to 4 show a preferred embodiment of a device according to the invention coupled with a locking device of a safety belt. The locking device comprises a housing 1, a lock bolt 3 movable therein and loaded by a spring 2 and a key 5 connected with a safety belt 4 and having a recess 6 to be engaged by the lock bolt 3. The lock bolt 3 is coupled with a control-member 7 in the form of an arm which is engaged by the switching element 8 of a control-device 10 provided with a time-delay device 9 in accordance with the invention.

The locking device can be manually operated by means of a knob 11, which can be pushed inwards against the action of a compression spring 12 so that the lug 13 pushes the lock bolt 3 out of the recess 6, after which the key 5 can be removed from the housing. When inserting the key 5 into the housing 1 the lock bolt 3 is pushed aside until it snaps into the recess 6 by the action of the spring 2. At the insertion of the key 5 into the housing a compression spring 14 is stretched at the same time.

The housing 1 is fastened to the chassis or the seat 15 of a vehicle, boat or airplane with the aid of a fastening element 16, which is slidably journalled in the housing 1. When a tractive force is exerted on the locking device, the springs 17 are stretched as is illustrated in FIG. 1. The arm 18 of a spring-loaded lever bears on the fastening element 16. A further arm 19 of said lever is located near the switching element 8. When the fastening element 16 is drawn out, a recess 20 gets in front of the arm 18 of the lever 19 so that by the action of the tensile spring 21 it is tilted and the arm 19 gets in front of the switching element 8, which can thus not move towards the control-element 7 of the lock bolt 3. In this way the control-device is prevented from opening the locking device when a tractive force is exerted on the latter. The locking device can still be opened by hand with the aid of the knob 11.

The switching element 8 is connected with the control-device 10 by means of a biassed spring 23 enclosed in a sheath 22. This control-device comprises a mass 24 displaceable in all horizontal directions and being guided by guide means formed by a bell-shaped frame part 28 and a base plate 101. The disc-shaped mass 24 is connected through a ball joint 103 with a tilting element 27. The tilting element 27 comprises a hemispherical element 25 operating like a ball joint and being journalled in the top side of the bell-shaped frame part and a pin 104 slidable therein and connected with the ball joint 103. On the flat top side of the hemispherical element 25 is bearing a dish 26 of the pressure element 30, which is loaded in downward direction by a spring 29, which is adjusted with the aid of a setting nut 102. By the downwardly directed pressure of the pressure element 30 the tilting element 27 is held in the rest position shown in FIG. 1. If the device experiences a given minimum deceleration, for example, resulting from a collision of the vehicle comprising the device so that the pressure force is overcome, the mass 24 will exert via the ball joint 103 a relative force on the tilting element 27, which will thus occupy the position shown in FIG. 2. The annular tilting rim 105 of the hemispherical element 25 urges the dish 26 of the pressure element 30 upwards so that the lever 31 is also urged upwards. Thus the hook 33 of the time-delay device 9 is drawn upwards. This hook 33 forms part of a toothed rack being in mesh with a pinion 34. The pinion 34 is coupled through a free-wheel coupling with a spring structure, which is stretched by the upward movement of the hook. The free-wheel coupling permits this movement to be rapidly performed. At the release of the tractive force on the hook 33 the spring structure is relieved and the pinion 34 is slowly turned back. Simultaneously with the upward movement of the rack connected with the hook 33 a toothed rack 35 also engaging the pinion 34 moves downwards. When the toothed rack 35 reaches its lowermost position a pin 38 strikes a rod 39 contacting the toothed rack 35 in the hole 36 so that at the return movement of the pinion 34 and hence of the rack 35 the rod 39 simultaneously moves upwards, thus compressing a spring 40. A ring 41 bearing on said spring is retained by an arm 42 of a lever loaded by a spring 43 until the other end 44 thereof is urged aside by the pin 38 so that the spring 40 is released. The resultant successive positions are illustrated in FIGS. 5 to 8.

Upon the release of the spring 40 the cylinder 45 and the sleeve 46 are urged upwards so that said cylinder pushes the spring 23 and the switching element 8 upwards as a result of which the lock bolt 3 is lifted out of the recess 6 of the key 5 and the key is pushed by the compression spring 14 out of the housing 1.

During the last part of the stroke of the rod 39 the head of the pin 38 is drawn upwards on a fixed ramp 47 out of the hole 36 so that the device is again ready for further use. The switching element 8 is then reset by the spring 106 in the sleeve 46.

The spring gear of the time delay device is proportioned so that when the switching element 8 is blocked by the arm 18 in the locking device this spring gear can turn back to an extend such that it moves the rod 39 against the spring 40 so that the arm 42 of the lever in the control-device is unlocked, but owing to the increasing pressure of the spring 40 not to an extent such that the pawl 38 touches the fixed ramp 47. As soon as the blocked state by the arm 18 terminates the rod 39 moves further upwards by the action of the spring structure to put the pin 38 into contact with the fixed ramp 47.

FIGS. 9 and 10 show two alternative embodiments of the control-device according to the invention.

FIG. 9 shows that the time-delay device 9 is arranged outside the housing of the control-device so that the lever 31 can be dispensed with. Instead a lever 107 is used, which can exert a tractive force via a cable 109 on the rack 50 of the time-delay device 9. Since in this embodiment upon a displacement of the mass 24 a downward movement of the lever 107 is obtained, the two racks of the preceding embodiment are combined to a single rack 50. It is also apparent that the tilting element 27 is coupled with the mass 24 through a different ball joint 108. The ball of the ball joint 108 is integral with the hemispherical element 25 and the mass 24 is provided with a partially cylindrical hole. Compared with the embodiment described above the latter embodiment has the advantage of a simpler construction. In the embodiment shown in FIG. 1, in which the tilting rim 105 is located at a distance above the tilting point 115 of the tilting element 27 it is an advantage like in the embodiment shown in FIGS. 1 and 2, that with an increase in deflection of the mass 24 the lever ratio becomes more favourable so that with an increasing deflection the switching force increases progressively. With an increasing deflection the influence of the increasing spring pressure diminishes relatively. By suitably providing the top face of the tilting element 27 and the cooperating dish 26 with a curvature any desired characteristic can be obtained.

FIG. 10 shows an embodiment in which, like in FIG. 9, the time-delay device is arranged above the bell-shaped frame part 28, but again two toothed racks are used here like in the embodiment first described. In this way a movement can be performed in a direction opposite that of FIG. 9.

FIG. 12 schematically shows a vehicle 110 in which a control-device 111 embodying the invention is mounted. The control-device 111 is coupled with the locking device 1 for the safety belt 4. Moreover, the control-device 111 is coupled with the door lock 112 of the vehicle. It is thus ensured that the door lock 112 automatically opens after a collision so that the car can be rapidly abandoned or, as the case may, be passers-by readily have access to the passengers.

It is also possible to couple the control-device 111 with an alarm device 113 so that when the parked vehicle 110 is run into the alarm device 113 can become operative to warn the owner or user of the vehicle. In order to prevent fire after a crash the control-device 111 can also cut off the electric voltage and the petrol feed.

I claim:

1. In a safety system, the combination of a housing having a base plate portion and an annular guide surface means in spaced parallel relation to said base plate portion, a disc shaped mass captive between said base plate portion and said annular guide surface means and having an upstanding tubular member extending upwardly through the center of said annular guide surface means so that the disc is movable in a generally horizontal plane within the limits dictated by engagement of said tubular member with said guide surface means, said housing also including ball seat means concentric with said annular guide surface means and having an opening centrally thereof, a semispherical ball member seated in said ball seat means and having a ball extension received within said tubular member, said ball member having a flat upper surface disposed generally horizontally when said ball extension is centered with respect to said annular guide surface means, said housing also incuding a guide sleeve above said flat upper surface and concentric with said annular guide surface means, a plunger reciprocably received in said guide sleeve and having a button-like lower end engaging said flat upper surface so that said plunger is moved upwardly as said disc is moved from its home position and said flat upper surface is tilted, spring means urging said plunger downwardly for normally urging said disc to its home position, and means responsive to upward movement of said plunger for actuating a safety device.

2. In a safety system including a safety device to be actuated in response to an acceleration force exceeding a predetermined magnitude, a mass for sensing acceleration force, guide means for constraining said mass to move in a generally horizontally path, and transmission means connecting said mass to said device for normally forcing said mass to a home position and for actuating said device in response to movement of said mass from said home position, said transmission means comprising a tilting element connected with the mass through a first ball joint and journalled on a frame through a second ball joint and provided with an annular tilting rim and a downwardly spring-loaded pressure element slidably journaled in the frame opposite the tilting rim and cooperating with the tilting rim.

3. A device as claimed in claim 2, characterized in that the tilting rim is located on the side of the tilting point of the second ball joint remote from the mass.

4. In a safety system including a safety device to be actuated in response to an acceleration force exceeding a predetermined magnitude, a mass for sensing acceleration force, guide means for constraining said mass to move in a generally horizontal path, and transmission means connecting said mass to said device for normally forcing said mass to a home position and for actuating said device in response to movement of said mass from said home position, the transmission means comprising a time delay device transferring the movements of the mass with time delay to the safety device.

5. A device as claimed in claim 4 wherein the safety device is coupled with the lock bolt of a locking device of a safety belt for unlocking the same by activation.

6. A device as claimed in claim 5, wherein the locking device comprises a blocking mechanism which, when exposed to a tractive load, prevents unlocking by the safety device.

7. In a safety system including a safety device to be actuated in response to an acceleration force exceeding a predetermined magnitude, a mass for sensing acceleration force, guide means for constraining said mass to move in a generally horizontal path, and transmission means connecting said mass to said device for normally forcing said mass to a home position and for actuating said device in response to movement of said mass from said home position, said transmission means comprising an arcuate member having a pivot center displaced from said path and an extension engaging said mass.

8. In a safety system as defined in claim 7 wherein said transmission means includes a resilient member applying a generally vertically directed restoring force to force said mass along said generally horizontal path to the home position thereof.

9. A device as claimed in claim 7 wherein the safety device is coupled with a door lock of a vehicle for unlocking the same when activated.

10. A device as claimed in claim 7 wherein the safety device is actively coupled with the actuating member of an alarm device.

11. In a safety system as defined in claim 7 wherein said arcuate member is of semispherical shape and said guide means constrains said mass for movement within a generally horizontal plane.

12. In a safety system as defined in claim 11 wherein said mass is a disc.

13. In a safety system as defined in claim 12 including a tubular member projecting laterally from said disc and said extension has a ball end received in said tubular member.

14. In a safety system as defined in claim 13 wherein said arcuate member has a flat surface and said transmission means includes a disc-like button which said resilient member presses against said flat surface whereby said button is cammed by said arcuate member as the disc moves from the home position.

* * * * *